United States Patent [19]
Wilhelmsen

[11] 3,714,622
[45] Jan. 30, 1973

[54] ADAPTIVE AGC SYSTEM

[75] Inventor: Carl R. Wilhelmsen, Huntington Station, N.Y.

[73] Assignee: The United States of America as represented by the Secretary of the Navy

[22] Filed: Dec. 12, 1969

[21] Appl. No.: 884,419

[52] U.S. Cl. ............340/16, 307/263, 325/113, 325/152, 325/187, 325/341, 325/402, 328/128, 340/15, 340/258, 340/261
[51] Int. Cl. ............................G08b 13/16
[58] Field of Search..............340/16 C, 15, 258, 261; 325/62, 113, 152, 187, 341, 402; 307/263, 279, 304; 328/127, 128; 179/1 N

[56] References Cited

UNITED STATES PATENTS

| 3,564,493 | 2/1971 | Hicklin | 340/15 |
| 2,692,334 | 10/1954 | Blumlein | 328/128 |
| 3,276,006 | 9/1966 | Hansen | 340/261 |
| 3,552,520 | 1/1971 | Naubereit | 340/16 C |
| 2,675,469 | 4/1954 | Harker et al. | 328/128 |
| 3,164,787 | 1/1965 | Fontaine | 328/128 |

Primary Examiner—Benjamin A. Borchelt
Assistant Examiner—H. A. Birmiel
Attorney—R. S. Sciascia and Henry Hansen

[57] ABSTRACT

Acoustic information is applied to a transducer and the electrical signal from the transducer is supplied to a modulator and transmitted if the signal both exceeds a predetermined level for a specified period of time and increases during this time above a specified rate. This is attained by applying the electrical signal to an AGC difference circuit with a feedback control so that the AGC difference circuit provides a constant output that is not transmitted so long as the input signal does not increase above a predetermined rate. If however the signal increases above the predetermined rate a field effect transistor difference amplifier senses the increased rate and fires a Schmitt trigger whose output applied to an integrator circuit for a specified period of time actuates a control gate enabling battery power to be applied to a transmitter for transmission of a modulated signal carrying the acoustic information.

8 Claims, 2 Drawing Figures

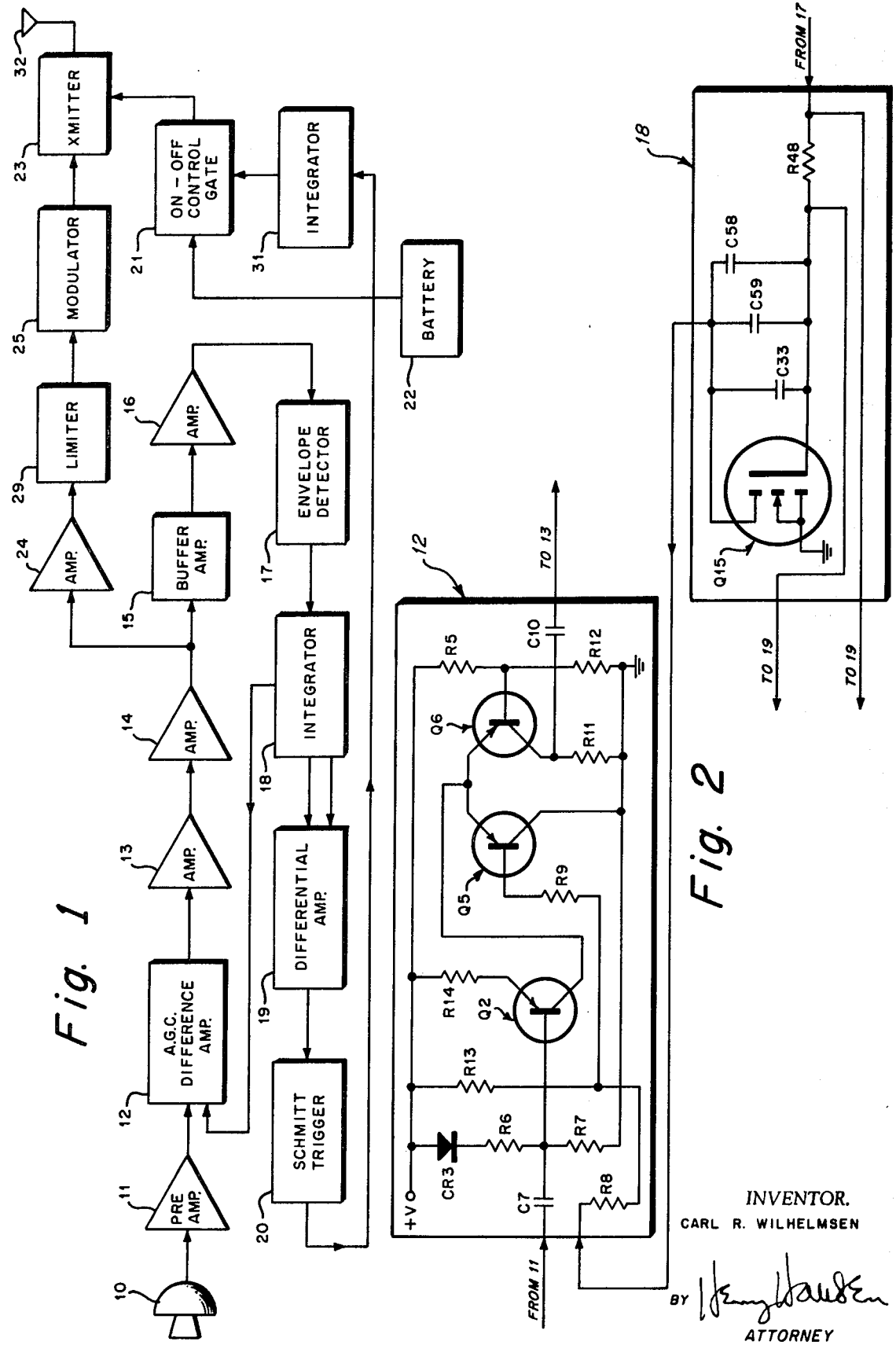

ADAPTIVE AGC SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to a radio transmission system in which acoustic information is applied to a transducer and the transducer's output electrical signal is amplified and fed to a modulator for modulating a radio frequency signal for transmission purposes. More particularly, the invention pertains to a system in which transmission occurs only if the input acoustic signal is of sufficient magnitude and increases above a specific rate for a predetermined period of time. Such a system is particularly useful in detecting the movement of motor vehicles.

The transmitter is energized by a d.c. power supply with limited useful life. It therefore becomes imperative that the power supply not be used at times when the received signal is not of sufficient importance. In order to accomplish this result the system itself has built into it a means of determining useful information so that only this useful information is transmitted to a distant point. At other times in order to prolong the useful life of the system it is necessary that the power supply is not in use.

SUMMARY OF THE INVENTION

Accordingly, it is a general purpose of the present invention to provide a system that distinguishes between a constant sound level and a rising sound level.

This is accomplished by a feedback from a Miller-type integrator to an AGC system so that signals whose rate of increase do not exceed a predetermined rate provide a constant output. If this threshold of rate-increase is exceeded for a predetermined period of time in a signal of sufficient magnitude this increased level is detected and a control switch applies battery power to a transmitter so that this desired signal is transmitted to a distant receiving station.

BRIEF DESCRIPTION OF THE DRAWINGS

FIG. 1 is a block diagram of a system according to the invention; and

FIG. 2 is a schematic circuit diagram of an AGC difference amplifier and a Miller-type integrator as applied to the system of FIG. 1.

DESCRIPTION OF THE PREFERRED EMBODIMENT

Referring to FIG. 1, a microphone 10 is adapted to receive an acoustic signal and transmit an electrical signal representative of the received acoustic signal to a preamplifier 11. The signal from the preamplifier 11 is applied to one of two inputs of an AGC difference amplifier 12. The output of the AGC difference amplifier 12 is respectively amplified through identical amplifiers 13 and 14 connected in series. A buffer amplifier 15 is interposed after amplifier 14 to isolate the load from the remainder of the circuit. The output of the amplifier 15 is applied to another amplifier 16 identical to both amplifiers 13 and 14. An envelope detector 17 receives the output of amplifier 16 and in a manner well known in the art provides a signal that is indicative of the peaks of the signal applied thereto. The output of the envelope detector 17 is applied to a Miller-type integrator 18 that provides a feedback to the AGC difference amplifier 12 that is of a level to prevent an increase in the output of the AGC difference amplifier unless a predetermined rate of increase in the input signal to the AGC difference amplifier 12 is exceeded. In the event the input signal does exceed the predetermined rate the output of the AGC difference amplifier 12 is increased and this increase is sensed by a differential amplifier 19 connected to the output of Miller-type integrator 18. Amplifier 19 on sensing the increase in amplitude of the signal at the integrator 18 provides an output signal that fires a conventional Schmitt trigger 20. The trigger 20 on being actuated applies a constant level signal to an integrator 31. If the trigger 20 remains fired for a predetermined period of time the output signal of integrator 31 rises to a sufficient value to actuate a control gate 21. Control gate 21 on being actuated connects a battery 22 to a transmitter 23 so that the transmitter 23 sends an applied signal by means of an antenna 32 to a distant receiver (not shown).

The amplifier 14 in addition to supplying its output signal to amplifier 15 also supplies its output signal to an amplifier 24 that in turn provides a signal to the input of a limiter 29. The limiter 29 provides an audio signal to a modulator 25 below the threshold amplitude that would cause overmodulation. Modulation of an r.f. signal by the audio signal containing the acoustic information takes place in the modulator 25 and this modulated signal is applied to the transmitter 23 which is connected to the antenna 32. Transmission occurs only on the activation of control gate 21 by means previously described.

Referring now to FIG. 2 there is shown a schematic diagram of the AGC difference amplifier 12 and the Miller-type integrator 18 in its feedback circuit.

The preamplifier 11 is connected to a coupling capacitor C7 that has its other terminal connected to a voltage divider comprised, in one leg connected to a d.c. supply +V, of a diode CR3 and a resistor R6 and, in the other leg connected to ground, a resistor R7. The common junction of C7, R6 and R7 is connected to the base of a PNP transistor Q2 that has a resistor R14 connected to its emitter and has its collector connected to the emitters of PNP differential transistors Q5 and Q6. Transistor Q5 has its collector tied to ground and has its base connected to a resistor R9 which has its other terminal connected to a voltage dividing circuit comprising a resistor R13 in one leg connected to the +V, and a resistor R8 together with an MOS field effect transistor Q15 in the other leg connected to ground. Transistor Q6 has its base connected to a dividing circuit comprising a resistor R15 in one leg connected to the +V and a resistor R12 in the other leg connected to ground. A resistor R11 is connected between the collector of transistor Q6 and ground. The collector of transistor Q6 is also coupled as the output of amplifier 12 to the amplifier 13 through a coupling capacitor C10.

One terminal of a resistor R48 of the integrator 18 is connected to detector 17. The other terminal of resistor R48 is connected to the gate of transistor Q15 and parallel capacitors C58, C59 and C33. The other terminals on the capacitors are tied together and connected to the drain of transistor Q15. The transistor Q15 has its sources tied together and grounded. Resistor R48 also has its two terminals connected to the respective inputs of difference amplifier 19 so that amplifier 19 may detect a voltage drop across resistor R48 above a predetermined level.

The operation of the AGC difference amplifier 12 with its associated feedback from Miller-type integrator 18 will now be explained.

A signal from the preamplifier 11 is applied to the base of transistor Q2. In response to the applied signal the collector of transistor Q2 supplies a current signal to the emitters of transistors Q5 and Q6 that is proportional to the signal applied to the base of transistor Q2. This current divides with a fraction of it passing to the grounded collector of transistor Q5 and the remainder passing to the collector of transistor Q6 as an output signal to be supplied to amplifier 13. This signal in modified form is received by integrator 18. In integrator 18 the signal is applied to the gate of transistor Q15. A rise in the level of the signal applied to the gate of transistor Q15 will make Q15 more conductive therefore causing more current to flow from +V through the series combination of R13, R8 and Q15 to ground. This will in turn lower the voltage applied to the base of transistor Q5 so that the transistor will pass more current from transistor Q2 to ground if the amplitude of the signal is rising in order to maintain a constant current through transistor Q6. Conversely if the current signal from transistor Q2 is falling the feedback signal applied to the base of transistor Q5 lowers the current through transistor Q5 maintaining a constant current through transistor Q6.

When the current signal from transistor Q2 increases above a predetermined rate the integrator 18 does not respond quickly enough to have a sufficient change in the signal applied to the base of transistor Q5 that would shunt the increased current through transistor Q5. As a result the current through transistor Q6 increases and if the current signal is of sufficient magnitude this increased signal provides a sufficient voltage drop across resistor R48 to operate amplifier 19. This operation of amplifier 19 results in transmitter 23 being turned on as previously described.

It can therefore be seen that the system provides for an output signal from transmitter 23 only when the input signal exceeds a predetermined level and is of a rising magnitude above a predetermined rate. In this manner a self-contained, battery-supplied unit is able to operate over a sufficiently long period of time. The alternative of providing a constant transmission of the signal applied to the microphone would quickly use up the battery power and render the system of far less value.

Obviously many modifications and variations of the present invention are possible in light of the above teachings. It is therefore to be understood that within the scope of the appended claims the invention may be practiced otherwise than as specifically described.

What is claimed is:

1. A detector system comprising:

signal generating means for generating an electrical signal; and
    detecting means having a difference amplifier for receiving both said electrical signal and a feedback signal and providing an output signal, envelope detector means for receiving said difference amplifier output signal and providing an output signal indicative of the peaks of the received difference amplifier output signal, and integrator means for receiving said envelope detector means output signal and providing said feedback signal having a rate of increase within a predetermined limit, and providing an output signal proportional to the difference in the rates of change of said received envelope detector means output signal and said feedback signal, said detecting means providing an output signal only if the rate of increase in amplitude of said electrical signal exceeds a predetermined rate.

2. A detector system according to claim 1 wherein said integrator means further comprises:

resistor means connected at one end for receiving said envelope detector means output signal;
    capacitor means having one side connected to the other end of said resistor means; and
    field effect transistor means having a gate connected to the junction of said resistor means and capacitor means, a source connected to ground, and a drain connected to said one side of said capacitor means for providing said feedback signal.

3. A detector system according to claim 2 wherein said signal generating means further comprises:

a microphone for detecting an acoustic signal and providing said electrical signal of a frequency and amplitude indicative of the acoustic signal detected.

4. A radio transmission system comprising:

transducer means for detecting sound and providing a first signal indicative of the amplitude and frequency of the sound;
    circuit means for receiving said first signal and providing a second signal of constant rate-increasing amplitude when the rate of increase of the amplitude of said first signal exceeds a predetermined rate and providing a third signal indicative of the frequency of said first signal and the amount the rate of increase of amplitude of said first signal exceeds a predetermined rate of increase;
    control means for receiving said second signal and providing power at a predetermined level of said received signal; and
    transmitter means for receiving said third signal and said power and providing an r.f. output signal indicative of the sound.

5. A radio transmission system according to claim 4 wherein said circuit means further comprises:

a difference amplifier for receiving said first signal and a feedback signal and providing said third signal;
    detector means for receiving said third signal and providing an output signal indicative of the peaks of the received signal;
    first integrator means for receiving said detector means output signal and providing said feedback signal having a rate of increase within a predetermined limit, and an output signal proportional to the difference in the rates of change of said received signal and said feedback signal;

a Schmitt trigger for receiving said first integrator means output signal and providing an output when the received signal exceeds a predetermined level; and second integrator means for receiving and integrating said trigger output and providing said second signal.

6. A radio transmission system according to claim 5 wherein said transmitter means further comprises:

limiter means for receiving said third signal and providing an output signal indicative of the frequency and predetermined maximum amplitude of the received signal;

modulator means for receiving the limiter means output signal and providing an r.f. output signal modulated in accordance with the received signal; and antenna means for receiving and transmitting said modulator means output signal.

7. A radio transmission system according to claim 6 wherein said control means further comprises:

an electrical power source; and switching means for receiving said second signal and the output of said source for providing said power.

8. A measuring system comprising:

generating means for providing a gain controlled variable d.c. signal;

resistor means connected at one end for receiving said variable d.c. signal;

capacitor means having one side connected to the other end of said resistor means;

a field effect transistor having a gate connected to the junction of said resistor means and capacitor means for receiving said d.c. signal, a source connected to ground, and a drain connected to the other side of said capacitor means;

first connection means connected from the junction of said drain and capacitor means to said generating means for controlling said variable d.c. signal;

second connection means connected to both ends of said resistor means for providing an output signal indicative of a voltage drop across said resistor means.

* * * * *